No. 728,332. PATENTED MAY 19, 1903.
R. H. THOMAS.
COMBINED SCRUB BRUSH AND MOP AND WRINGER THEREFOR.
APPLICATION FILED AUG. 11, 1902.
NO MODEL.
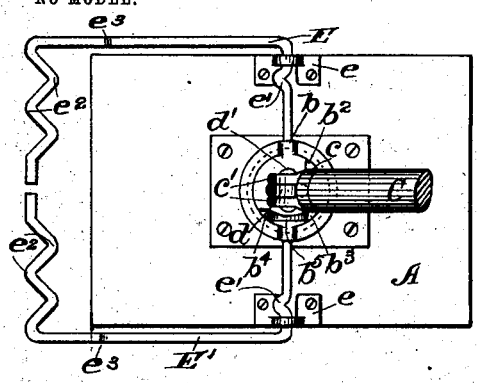
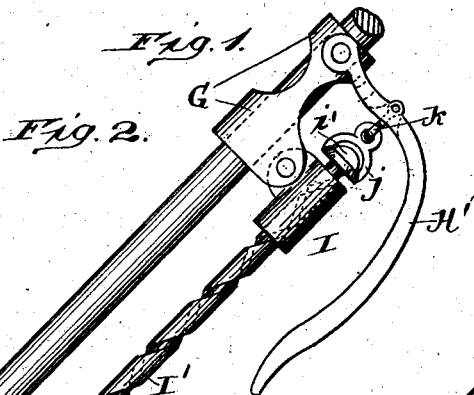
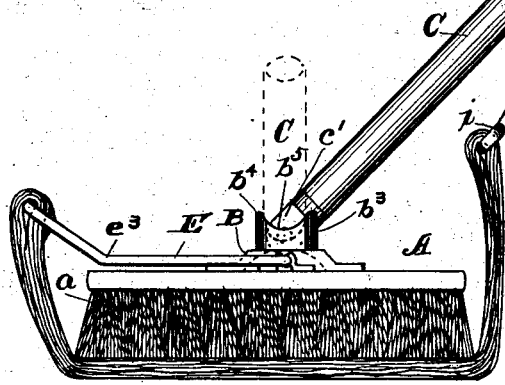
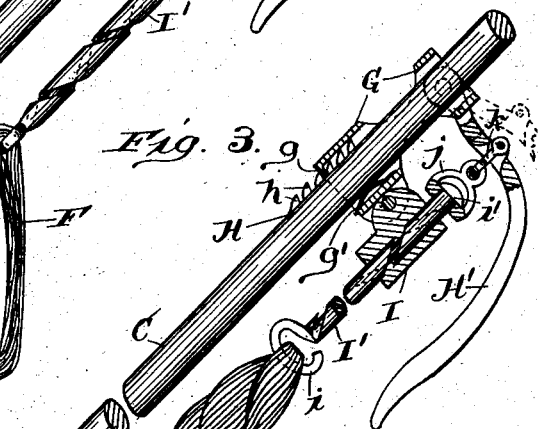
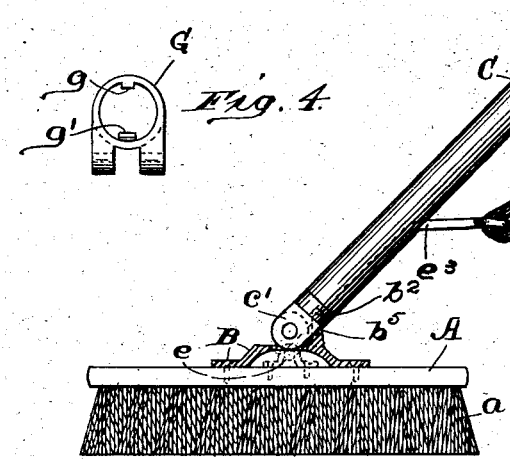
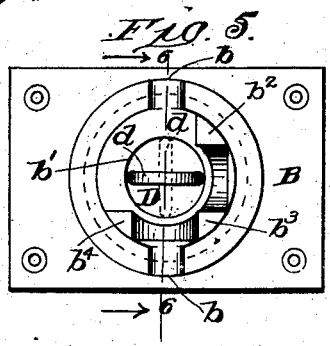
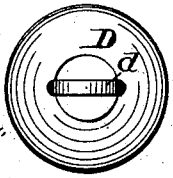
Witnesses:
Chas. E. Gorton.
A. Gustafson.
Inventor:
R. H. Thomas.
By Chas. A. Tillman
Atty.
THE NORRIS PETERS CO., PHOTO-LITHO., WASHINGTON, D. C.

No. 728,332. Patented May 19, 1903.

UNITED STATES PATENT OFFICE.

RICHARD H. THOMAS, OF CHICAGO, ILLINOIS.

COMBINED SCRUB-BRUSH AND MOP AND WRINGER THEREFOR.

SPECIFICATION forming part of Letters Patent No. 728,332, dated May 19, 1903.

Application filed August 11, 1902. Serial No. 119,172. (No model.)

*To all whom it may concern:*

Be it known that I, RICHARD H. THOMAS, a citizen of the United States, residing at Chicago, in the county of Cook and State of Illinois, have invented certain new and useful Improvements in a Combined Scrub-Brush and Mop and Wringer Therefor, of which the following is a specification.

This invention relates to improvements in a combined scrubbing-brush, mop, and wringer therefor; and it consists in certain peculiarities of the construction, novel arrangement, and operation of the various parts thereof, as will be hereinafter more fully set forth and specifically claimed.

The objects of my invention are to provide a device of the above-named character which shall be so constructed that the brush may be moved back and forth endwise or with its broad side presented to the operator and so that the mop-cloth may be twisted or wrung by means of a hand-lever operated with either hand, so as to extract the water therefrom without soiling the hands of the operator.

Another object of the invention is to so construct the device that the mop-cloth when in position to be wrung will be held at a slight distance from the handle.

Still another object is to so construct the device that the handle may be attached to the brush block or body in such a manner that it will have a pivotal and rotary movement thereon, thus permitting its position to be easily and immediately changed, so as to use the brush lengthwise or sidewise when desired.

Other objects and advantages will be disclosed in the subjoined description and explanation.

The accompanying drawings show the invention in a convenient form; but many changes in details may be made within the skill of a good mechanic without departing from the spirit of the invention as set forth in the claims.

In order to enable others skilled in the art to which my invention pertains to make and use the same, I will now proceed to describe it, referring to the accompanying drawings, in which—

Figure 1 is a side view of the device, showing the parts in position when it is desired to use the mop-cloth for scrubbing or wiping the floor and illustrating by continuous lines the handle in position for moving the brush lengthwise and by dotted lines the position the handle will occupy when it is desired that the broad side of the brush shall be presented to the operator. Fig. 2 is a plan view of the block or body with the mop-cloth and wringer removed. Fig. 3 is a side view, partly in elevation and partly in section, showing by continuous lines the position the parts will occupy when it is desired to use the brush for scrubbing and by dotted lines when the mop-cloth is being wrung. Fig. 4 is a detached end view of the sliding sleeve which carries the wringing mechanism. Fig. 5 is a plan view of the handle attachment. Fig. 6 is a cross-sectional view thereof, taken on line 6 6 of Fig. 5; and Fig. 7 is a detached plan view of the rotatable disk or piece to which the lower end of the handle is secured.

Similar letters refer to like parts throughout the different views of the drawings.

A represents the block or body, which may be of any suitable size, form, and material, but preferably of wood and rectangular in shape, as shown in the drawings. This block or body is usually provided with bristles $a$, of any desired material, to form the brush; but it will be apparent from the subjoined description that the bristles may be omitted. Secured to the central upper portion of the block A is a plate B, which has in each of its sides an opening $b$ to receive the ends of the bail for holding one end of the mop-cloth, as will be presently explained. The lower surface of the plate B is formed with a concaved cavity or opening $b'$, and the upper surface of said plate is provided near the opening $b'$ with upwardly-projecting lugs $b^2$, $b^3$, and $b^4$, which are united by downwardly-curved recessed portions $b^5$ to permit the required inclination of the handle C, which has secured on its lower end a ferrule or cap $c$, provided with prongs $c'$, each of which is formed with a transverse opening. Located in the cavity $b'$ is a rotatable disk or piece D, which is convex on its upper surface and flat on its lower surface and has an upward projection $d$ extending through the opening of the cavity $b'$ near the above-named lugs to fit between the prongs $c'$ on the ferrule of the handle, which prongs are pivotally secured to the projection $d$ by means of a pin or pivot $d'$ passing through openings in the prongs and projection.

Pivotally secured transversely on the block or body A by means of a small bracket $e$, located at each side of the block, is the bail for one end of the mop-cloth, which bail preferably comprises two pieces E and E' of wire, bent to form substantially a rectangular figure, as shown. That portion of each of the pieces of the bail resting on the body has its end fitted into the opening $b$ therefor of the plate B, and each of said pieces is provided near the brackets $e$ with a bend $e'$ to prevent its outward movement. That portion of each of the pieces of the bail extending beyond the block or body is crimped or provided with bends $e^2$, as shown in Fig. 2, to prevent the mop-cloth slipping thereon. By reference to Figs. 1 and 3 of the drawings it will be seen that the pieces E and E', forming the bail, are each provided with an elbow $e^3$, which is for the purpose of holding the mop-cloth F out of contact with the handle C when it is being wrung.

Movably mounted on the handle is a sleeve G, which is provided at its lower portion with an inwardly-projecting tooth $g$ to engage the teeth $h$ of a rack-bar H, which is secured to the handle at a suitable distance above the block or body. The lower portion of the sleeve G has secured to its inner surface a spring $g'$, employed to hold the tooth $g$ in engagement with the teeth of the rack-bar when said sleeve is in its raised position, as shown in Fig. 3 of the drawings.

Pivotally secured to the upper portion of the sleeve G is a hand-lever H', which is preferably forked, so it will stride the sleeve and that its prongs may be connected to the sides thereof. Suitably connected to the lower portion of the sleeve is a worm-threaded socket-piece or female screw I, through which the worm-threaded rod or male screw I' passes.

The lower end of the rod I' is formed with a hook $i$ to receive the upper end of the mop-cloth, which is usually in the form of a loop or hank and is placed in position at its other end on the bail by springing the pieces E and E' apart, so that it may be passed between their outer ends. The upper end of the rod I' is provided with a head $i'$, which engages a swivel $j$, pivotally secured to the hand-lever H' by means of a link $k$, as is clearly shown in Figs. 1 and 3 of the drawings.

The operation of the device is simple and as follows: When it is desired to use the brush for scrubbing the floor or other surface, the sleeve G is slid upwardly on the handle to the position shown in Fig. 3, where it will be held by reason of the engagement of the tooth $g$ with the teeth of the rack-bar. When in this position, the mop-cloth may be wrung by raising the hand-lever H' to the position indicated by dotted lines in said figure, in which operation it is evident that as the rod I' passes through the socket I it will be given a rotary motion, thus twisting the cloth. When it is desired to use the mop, the sleeve G is disengaged from the teeth of the rack-bar and allowed to slide down on the handle, when the cloth and bail may be swung under the brush to the position shown in Fig. 1 of the drawings. The handle C being pivotally secured to the projection $d$ of the rotatable piece D, it is apparent that by placing the handle in a vertical position and by turning it about one-quarter around it may be made to fit between the lugs $b^2$ and $b^3$, so as to move the brush longitudinally or between the lugs $b^3$ and $b^4$, thus being in position to move the brush with its broad side to the operator.

Having thus fully described my invention, what I claim as new, and desire to secure by Letters Patent, is—

1. The combination with a block or body, of a handle secured thereto, a bail pivotally secured on the block, a sleeve movably mounted on the handle, a worm-threaded socket-piece connected to the sleeve, a hand-lever pivotally connected to the sleeve, a worm-threaded rod located in the said socket-piece and connected to the hand-lever at one of its ends, and a mop-cloth connected at one of its ends to the bail and at its other end to the lower end of said rod, substantially as described.

2. The combination with a block or body, of a handle secured thereto, a toothed rack-bar on the handle, a sleeve movably mounted on the handle and having in its lower portion an inwardly-projecting tooth, a worm-threaded socket-piece on the sleeve, a lever pivotally secured at one of its ends to the sleeve, a worm-threaded rod located in the said socket-piece and connected at one of its ends to the hand-lever, and a mop-cloth connected at one end to the block or body and at its other end to the lower end of the said rod, substantially as described.

3. The combination with a block or body, of a plate secured to its upper surface and having in each of its sides an opening, a bail pivotally secured on the block or body and having its ends extending into said openings, a handle pivotally and rotatably connected to the plate, a toothed rack-bar on the handle, a sleeve movably mounted on the handle and having in its lower portion an inwardly-projecting tooth, a spring on the inner surface of the sleeve, a hand-lever pivotally secured to the sleeve, a worm-threaded socket-piece attached to the sleeve, a worm-threaded rod located in the socket-piece and connected at its upper end to the hand-lever, and a mop-cloth connected at one of its ends to the bail and at its other end to the lower end of said rod, substantially as described.

4. The combination with a block or body, of a bail pivotally secured on the block and having an elbow in each of its sides, a handle secured to the block, a toothed rack-bar on the handle, a sleeve movably mounted on the handle and having in its lower portion an inwardly-projecting tooth, a worm-threaded socket-piece on the sleeve, a lever pivotally secured at one of its ends to the sleeve, a
5 worm-threaded rod located in the said socket-piece and connected at one of its ends to the hand-lever, and a mop-cloth connected at one of its ends to the bail and at its other end to the lower portion of the said rod, substantially as described.

RICHARD H. THOMAS.

Witnesses:
 CHAS. C. TILLMAN,
 A. GUSTAFSON.